US007702552B2

(12) United States Patent
Schnall

(10) Patent No.: US 7,702,552 B2
(45) Date of Patent: *Apr. 20, 2010

(54) METHOD AND APPARATUS FOR MONITORING GUARANTEED LOANS AND NOTIFYING GUARANTORS

(75) Inventor: Peter A. Schnall, Falls Church, VA (US)

(73) Assignee: Capital One Financial Corporation, McLean, VA (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/068,428

(22) Filed: Feb. 6, 2008

(65) Prior Publication Data

US 2008/0215481 A1 Sep. 4, 2008

Related U.S. Application Data

(63) Continuation of application No. 09/783,980, filed on Feb. 16, 2001, now Pat. No. 7,340,434.

(51) Int. Cl.
G06Q 40/00 (2006.01)
(52) U.S. Cl. ..................................... 705/35; 705/36 R
(58) Field of Classification Search .............. 705/34–45
See application file for complete search history.

(56) References Cited

U.S. PATENT DOCUMENTS 4,774,664 A 9/1988 Campbell et al.
5,611,052 A 3/1997 Dykstra et al.
2001/0037274 A1 11/2001 Monticciolo
2002/0019793 A1 2/2002 Frattalone
2002/0103667 A1 8/2002 Jannah et al.
2002/0103750 A1 8/2002 Herzfeld

FOREIGN PATENT DOCUMENTS

JP 2002041780 2/2002

OTHER PUBLICATIONS

Erick Bergquist, "Wells Widens Web Menu in Rollout to All Clients," *American Banker*, vol. 65, Issue 144, Jul. 28, 2000, pp. 9-10.
"Quest For The One-Stop Shop," *Mortgage Technology*, vol. 8, Issue 1, Jan./Feb. 2002, pp. 18-23.
http://www.bankisrael.gov.il/deptdata/pikuah/nihul_takin/eng/453_et.pdf.

*Primary Examiner*—Richard C Weisberger
(74) *Attorney, Agent, or Firm*—Finnegan, Henderson, Farabow, Garrett & Dunner, L.L.P.

(57) ABSTRACT

A method and apparatus are provided for notifying a guarantor associated with a guaranteed loan of events likely to affect their interest in the guaranteed loan. The disclosed method and apparatus provides loan data with information on at least one guaranteed loan wherein the loan data includes information on the terms of the loan. The method and apparatus then monitors changes in the loan data and determines when changes in the loan data corresponding to the at least one guaranteed loan indicates a likelihood that the terms of the loan may not be met. Based on the determination the method and apparatus provides a notification to the guarantor based on the determination that the loan terms may not be met.

31 Claims, 3 Drawing Sheets

METHOD AND APPARATUS FOR MONITORING GUARANTEED LOANS AND NOTIFYING GUARANTORS

RELATED APPLICATION

This application is a continuation of U.S. patent application Ser. No. 09/783,980, entitled "METHOD AND APPARATUS FOR MONITORING GUARANTEED LOANS AND NOTIFYING GUARANTORS," by Peter Schnall, filed on Feb. 16, 2001, now U.S. Pat. No. 7,340,434, and is hereby expressly incorporated by reference in its entirety.

BACKGROUND OF THE INVENTION

I. Field of the Invention

This invention generally relates to financial data processing systems and, more particularly, to a method and apparatus for monitoring guaranteed loans and notifying guarantors.

II. Background and Material Information

Many loans require a guarantor to guarantee the payback of the loan granted to a loan recipient. The guarantor may be an individual, a company or any other type of entity. Typically, lending institutions require the guarantor's backing on a loan because the loan recipient does not meet certain credit criteria established by the lending institution. For example, a business or person receiving a loan may have a poor credit history, one or more bankruptcy filings, low or no income stream, or other characteristics that make funding the loan risky. The guarantor helps the loan recipient qualify for a loan, despite these potentially higher risk factors, based on the guarantor's creditworthiness and willingness to guarantee payback of the loan in the event the loan recipient defaults on the loan.

Loans guaranteed by a guarantor include small credit card loans to large real estate loans. In each case, the loan recipient has the primary responsibility for paying back the loan according to the loan terms. If the loan recipient pays the loan according to the terms, the guarantor has no financial obligation to the lending institution. However, the guarantor may become financially liable if the loan recipient fails to pay installments on the loan or otherwise does not meet the terms of the loan. In the latter situation, the lending institution may look to the guarantor as the secondary party responsible for paying back the balance of the loan.

The guarantor may be unpleasantly surprised with the additional financial responsibility of satisfying the loan recipient's obligations. Unfortunately, in many cases, it may be too late for the guarantor to work with the loan recipient to pay back the loan amount or to restructure the terms of the debt. As a result, without sufficient warning or notification, the guarantor will have no choice but to payoff the loan recipient's debt.

In view of the foregoing limitations, there is a need in the financial industry to inform a guarantor that a loan recipient has failed to make payments and/or is at risk of defaulting on the loan. The guarantor could then take corrective action or steps in a timely manner to prevent the loan recipient from defaulting on the loan and eliminate the burden of paying back the loan.

SUMMARY OF THE INVENTION

In view of the foregoing, a method and apparatus are provided, consistent with the features of the invention, of notifying a guarantor of events likely to affect a guaranteed loan. The disclosed method and apparatus provides loan data with information on at least one guaranteed loan wherein the loan data includes information about the loan, such as the terms thereof. The method and apparatus then monitors changes in the loan data and determines when changes in the loan data corresponding to the at least one guaranteed loan indicates a likelihood that the terms of the loan may not be met. Based on the determination the method and apparatus provides a notification to the guarantor based on the determination that the loan terms may not be met.

BRIEF DESCRIPTION OF DRAWINGS

The accompanying drawings, which are incorporated in and constitute a part of this specification, illustrate the various features and embodiments of the invention and, together with the detailed description, serve to explain the advantages and principles of the invention. In the accompanying drawings.

DETAILED DESCRIPTION

Reference will now be made in detail to systems and methods, consistent with the present invention, that are illustrated in the accompanying drawings. Wherever possible, the same reference numbers in different figures refer to the same or similar parts.

Figure 1:
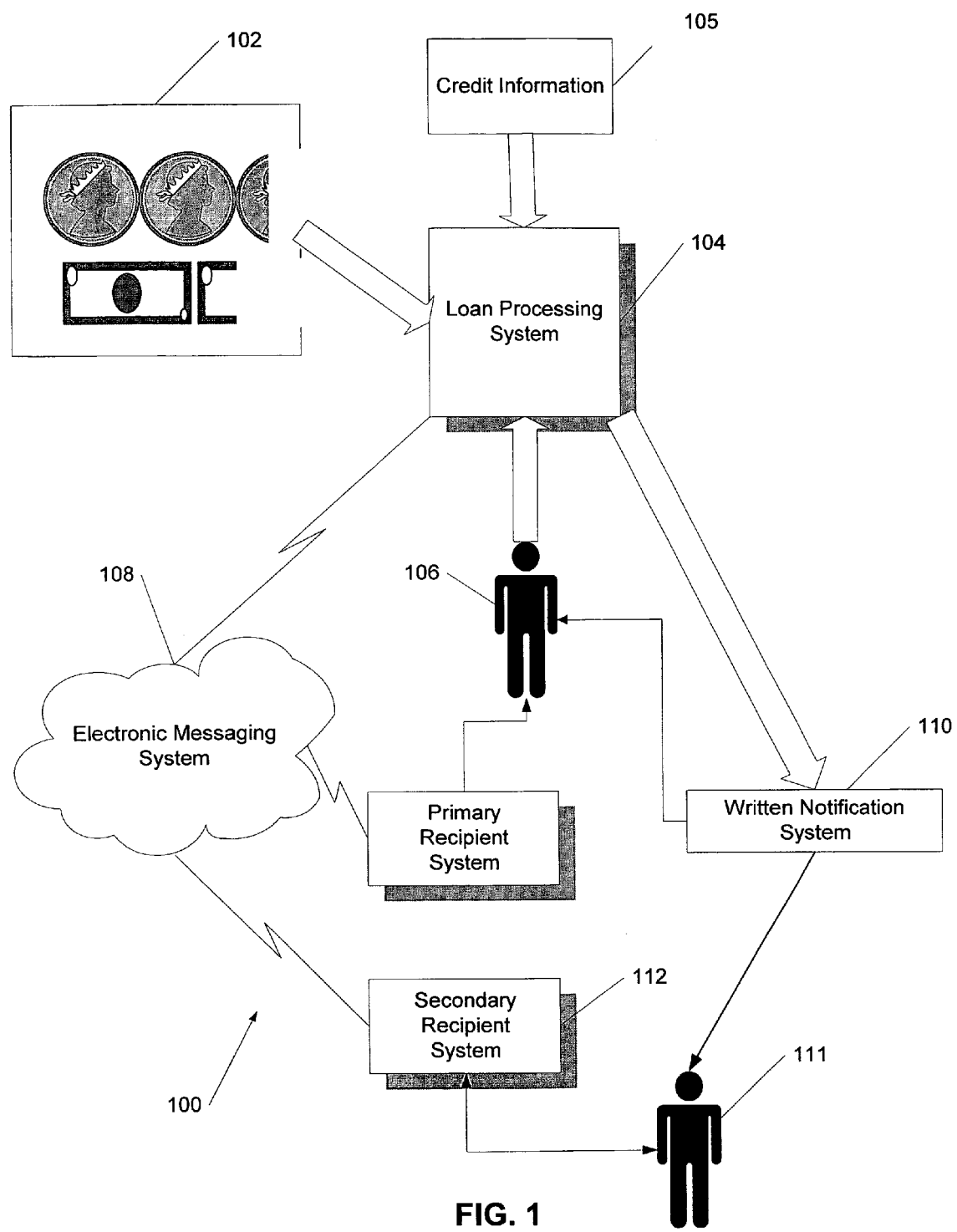
FIG. 1 is a block diagram of a financial data processing system consistent with the features of the invention.

FIG. 1 is a block diagram of a financial data processing system 100 consistent with the features of the present invention. System 100 includes a loan processing system 104, an electronic messaging system 108, a written notification system 110, and guarantor system 112. Loan processing system 104 and guarantor system 112 may be general purpose computers or computer subsystems within larger computer systems.

There are several methods to integrate loan processing system 104 or guarantor system 112 into existing or "legacy" computer systems. For example, these systems can be connected to the legacy computer system using a standard network protocol such as TCP/IP. For example, data being analyzed and used by loan processing system 104 can be transferred over a TCP/IP "socket" between loan processing system 104 and the legacy computer systems. Alternatively, data can be transferred between loan processing system 104 and legacy computer system using data stored on a tape or floppy disk storage device.

Loan processing system 104 receives information on loan recipient 106 and determines the loan recipient's qualifications for a loan based on credit information and loan information 102. Loan recipient 106 can be a person such as a student, an organization such as a corporation or partnership, or any other entity capable of receiving a loan. Credit information 105 includes information retrieved from one or more credit reporting agencies that indicate the creditworthiness of an entity or individual, such as loan recipient 106. Loan information 102 includes loan qualification information and information indicating the term and rate of the loan, the monthly payments required to pay off the loan, and historical payment information associated with the loan.

If loan processing system 104 determines that loan recipient 106 does not qualify individually for the loan, then credit information associated with a guarantor 111 may be analyzed to approve the loan. Guarantor 111 can be a person, an organization such as a corporation or partnership, or any other entity capable of guaranteeing a loan. Once a loan has been issued to loan recipient 106 backed by guarantor 111, loan information 102 may be regularly updated to provide current information on the loan. The current loan information may include, for example, the current outstanding balance of the loan, the last payment amount and date, and late payments or penalties on the loan. Loan information 102 may also include information identifying the guarantor of the loan and contact information for sending alerts and/or other types of notification.

Loan processing system 104 processes loan information 102 associated with a loan made to loan recipient 106 and determines when notification or alert should be sent to guarantor 111. If more than one guarantor is responsible for the loan, a separate notification can be sent to each guarantor. These notifications or alerts can be sent to guarantor 111 directly using written notification system 110 or through guarantor system 112 using electronic messaging system 108, including via the Internet. Guarantor system 112 can be a general purpose computer or a specialized device such as a wireless phone capable of receiving electronic messages. Electronic messaging system 108 may process various electronic messages including e-mail, Web access, facsimile, telephone messaging and/or electronic paging, to send notification to the guarantors. Written notification system 110 can be an automated system or a system controlled by personnel for sending written notification by letter or postcard through the mail to guarantor 111. Both forms of notification may be used to send alerts or, in accordance with a feature of the invention, the preferred form of sending alerts may be selected by the guarantor.

According to an aspect of the invention, guarantor alerts are sent in response to changes in the loan information detected by loan processing system 104. By way of example, loan processing system 104 may send a notification to a guarantor of the loan warning the guarantor that payment on the loan has not been paid in a timely manner and/or has been forwarded to a collection agency for collection. This notification can be sent early enough in the process so that the guarantor can contact the loan recipient and encourage payment or make other arrangements to pay the loan. In this example, the notification occurs when loan processing system 104 compares entries in a database associated with the loan processing system 104 indicating that the loan has not been paid or sent to collection. Loan processing system 104 can be programmed to monitor changes in loan information each time a database update occurs or at fixed time intervals, such as the close of business each day.

Figure 2:
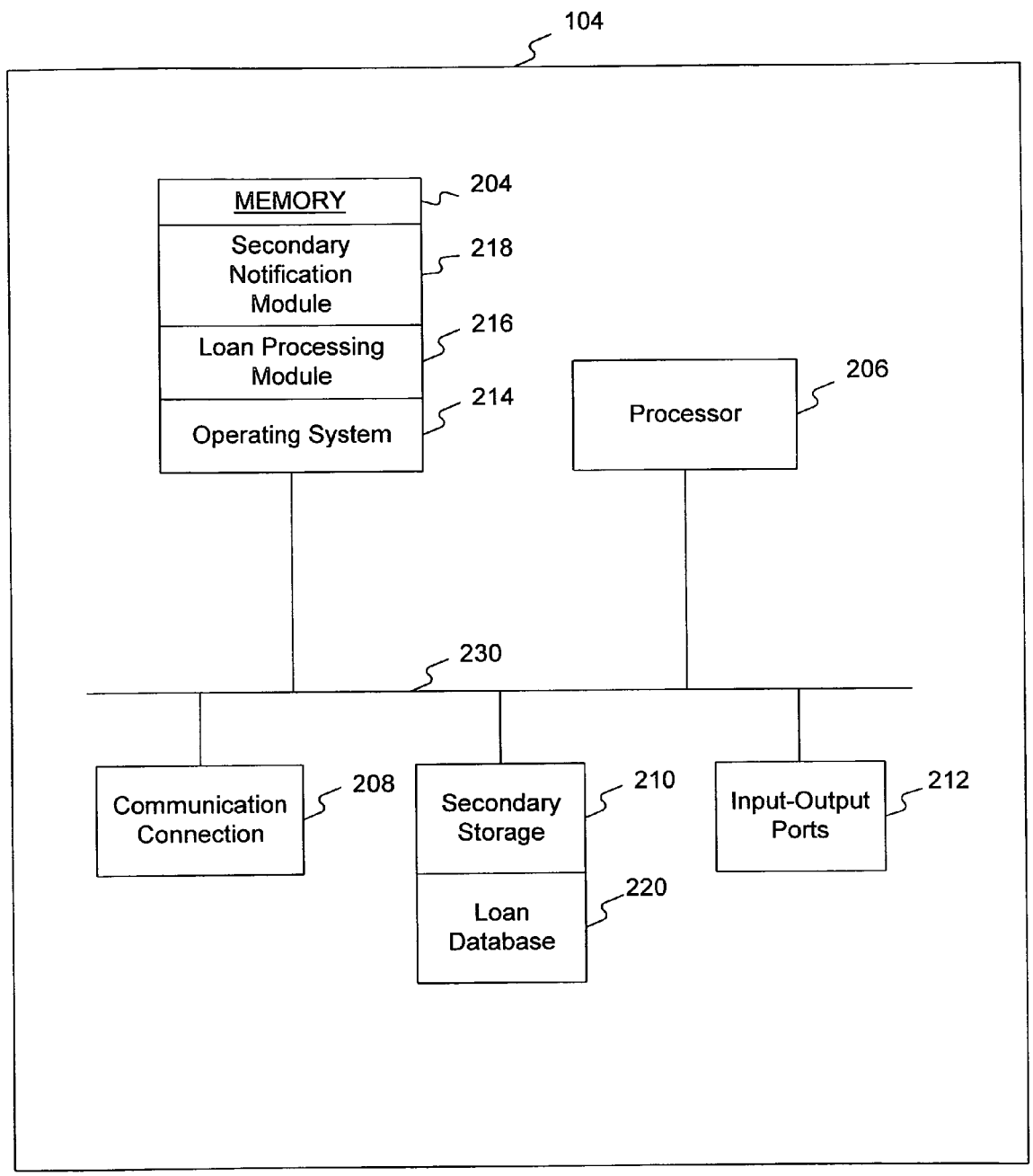
FIG. 2 is a block diagram of components used in a credit processing system for providing guarantor alerts, in accordance with the present invention.

FIG. 2 is an exemplary block diagram of the components that can be used to implement the loan processing system 104 and provide notification to a guarantor of a loan. Together, these components alert a guarantor that a guaranteed loan has not been paid in a timely manner and may become the responsibility of the guarantor. Such alert may be communicated by using a TCP/IP protocol, for example. Preferably, these components include a memory 204, a processor 206, a communication connection 208, a secondary storage 210, and input-output ports 212 that are inter-connected by a bus infrastructure or network 230. In accordance with an aspect of the invention, communication connection 208 may include communication devices compatible with asynchronous transfer mode (ATM), Fiber Distributed Data Interface (FDDI), Copper Distributed Data Interface (CDDI) or other equivalent protocols. CDDI is the implementation of FDDI protocols over shielded twisted pair (STP) and unshielded twisted pair (UTP) cabling. Secondary storage 210 can be a hard disk or other permanent storage device used to hold information used in processing information with processor 206. Input/output ports 212 may include serial ports or parallel ports for communication with a console, keyboard, mouse, printer or other devices. Although these components are highlighted, other components not specifically included herein may be included as part of different implementations of loan processing system 104 that are consistent with the teachings of the invention.

As illustrated in FIG. 2, memory 204 may be configured to store an operating system 214, a loan processing module 216, and a guarantor alert module 218 that are executed by processor 206. Operating system 214 manages resources such as memory 204 and secondary storage 210, as well as the allocation of bandwidth through communication connection 208. Operating system 214 also controls execution of modules on processor 206 and location of modules in memory 204.

Loan processing module 216 may include all of the necessary data processing tasks associated with loans and other debt instruments. These tasks include gathering information on loan recipients such as creditworthiness, determining maximum-qualified loan amounts based on creditworthiness, tracking payment of loans, and identifying loans made with a guarantee of payment by a guarantor. The data associated with the credit processing performed by loan processing module 216 can be stored in and accessed from a loan database 220. Loan database 220 may be organized and stored within secondary storage 210. Loan database 220 includes raw data on loans made by the lending institution (such as loan information 102) and may also includes data from credit reporting agencies (such as credit information 105) imported through communication connection 208. This loan information can be stored as raw credit and loan information within loan database 220 and/or may include a point-score system used by the credit reporting industries such as Fair Issac (FICO). Preferably, at least one table in loan database 220 will also indicate whether a loan has be co-signed and guaranteed by a guarantor. Contact information and notification preferences for each guarantor can also be provided in the loan database 220, in accordance with an aspect of the invention.

Guarantor alert module 218 includes data processing tasks, consistent with the features of the invention, for sending alerts to guarantors depending on the state of a particular guaranteed loan. Guarantor alert module 218 can be developed in a database programming language such as structured query language (SQL) or 4GL to access loan database 220, analyze the information and generate alerts from loan processing system 104. Alternatively, alert module 218 can be developed using object-oriented programming languages such as Java or non-object oriented programming languages such as C. In operation, guarantor alert module 218 obtains loan information from loan database 220. For example, guarantor alert module 218 can use SQL statements to retrieve the appropriate fields of information from loan database 220 corresponding to changes in loan information. As discussed above, the loan information can be transferred over a network connection or may be uploaded using a secondary storage device such as a tape or floppy-disk and stored in loan database 220.

Certain values associated with loan information in loan database 220 are compared against threshold values to identify loans potentially subject to default. For example, guarantor alert module 218 may locate loans in loan database 220 with late payments of over 60 days. A loan having a late payment over 60 days may be identified by alert module 218 and a notification may be sent to guarantor that the loan may be entering default.

Figure 3:
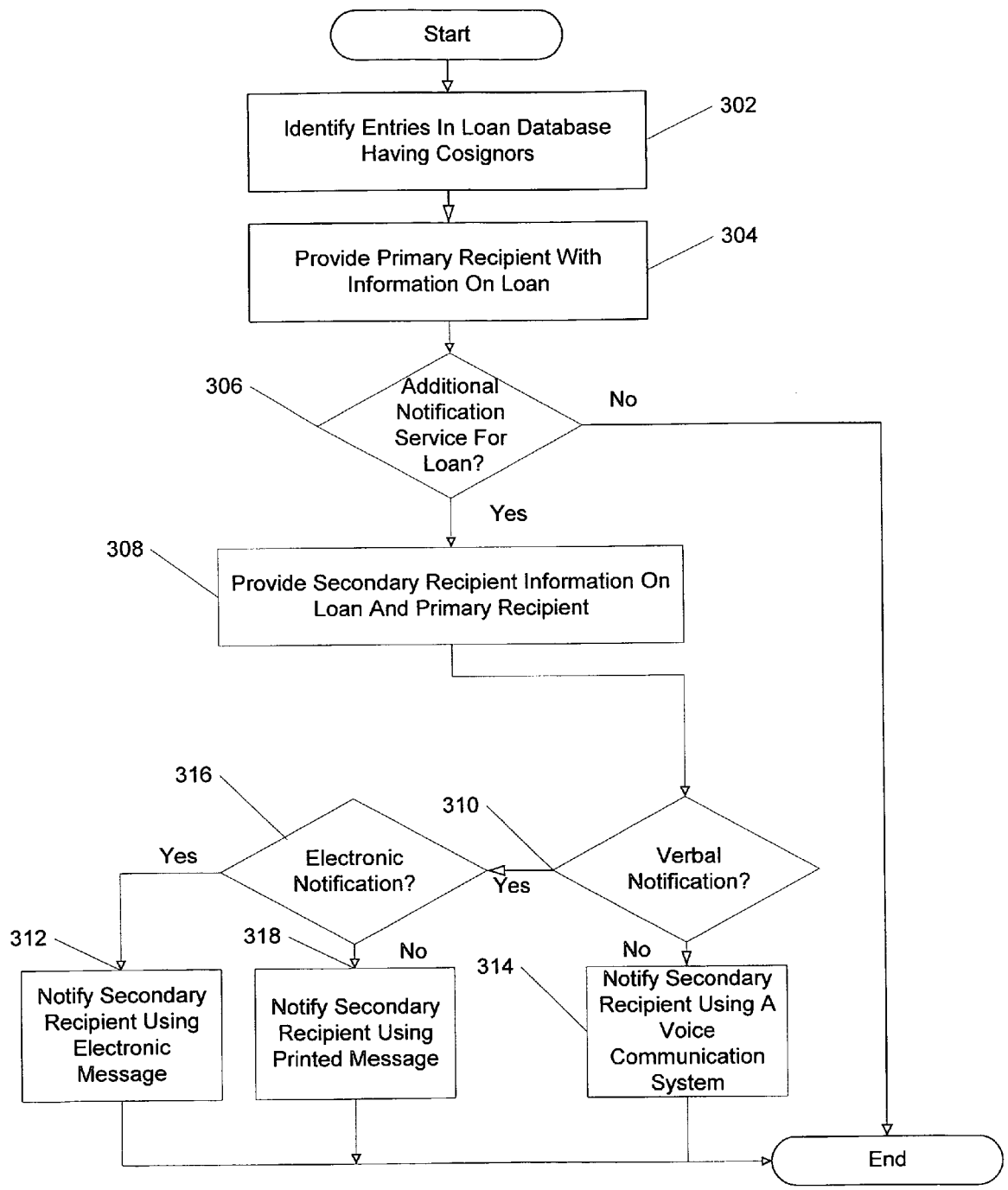
FIG. 3 is an exemplary flow chart indicating the various processes and operations for providing notification to guarantors, in accordance with the present invention.

FIG. 3 is an exemplary flow chart indicating the various processes and operations performed by the guarantor alert module 218 to transmit an alert to guarantors that a trigger event associated with a guaranteed loan has occurred. Preferably, the notifications will serve as a warning to the guarantor that the loan may soon be in default, thus, enabling the guarantor to take measures to guarantee payment of the loan.

As illustrated in FIG. 3, guarantor alert module 218 is initialized and executed by processor 206 in FIG. 2 to identify each loan associated with a guarantor (step 302). Guarantor alert module 218 may be initialized and executed on a periodic basis such as one or more schedule time intervals each day or continuous basis each time an update is applied to loan database 220. In order to identify guaranteed loans, guarantor alert module 218 may access the appropriate table in loan database 220 indicating each loan that is guaranteed by a guarantor. The table in loan database 220 may include a record entry for each loan that indicates information on the loan recipient, the guarantor(s) on the loan (if any) and the contact information for the guarantor, such as an e-mail address or an address. Additionally, notification preferences may be provided to identify the type of information to monitor in loan database 220 and the preferred form of notification (e.g., electronic, written or none) for sending notifications to the guarantor. The notification preferences may also be used to determine if notification service is active for a particular loan.

For each loan identified as having a guarantor, guarantor alert module 218 determines if loan servicing associated with the loan includes notifying the guarantor of changes associated with the loan (step 304). Some guarantors may wish to opt out of the guarantor alert service for various reasons, including to save money if a premium is charged by the lending institution for the service. If there is no guarantor notification service for the identified loan, then servicing of that loan by the guarantor alert module 218 is terminated or skipped, and the next loan is analyzed.

As further shown in FIG. 3, for each loan having the guarantor alert service, guarantor alert module 218 monitors changes in the loan data related to payment of the loan. Specifically, guarantor alert monitor module 218 checks for changes in loan data that indicates the loan recipient may not meet the terms of the loan or default on the loan (step 306). For example, guarantor alert module 218 may compare a threshold limitation related to the terms of the loan with the actual loan information associated with the loan. Exceeding the threshold limitation may create a trigger event indicating that the loan may be at risk of going into default. For each guaranteed loan, one or more trigger events may be monitored by the guarantor alert module 218 that are either selected by the guarantor or correspond to a predetermined set of trigger events selected by the lending institution. Preferably, the set of trigger events tracked by the alert module 218 correspond to events indicating that a loan recipient may default on the loan or that a term of the loan agreement may be violated.

For example, one trigger event may occur when the total loan amount on a credit card equals or exceeds the maximum loan amount threshold set by the lending institution. For example, a student in college may maximize the debt allowed on a credit card guaranteed by his or her parents. Another trigger event may occur when the maximum time period to make payments on a loan has been exceeded or the minimum required payments have not been met for one or multiple payment periods. Yet another trigger event may occur when the maximum debt has not been reached and the monthly payment on a debt has exceeded a maximum monthly payment threshold limitation. For example, a person with a low income may not maximize the debt carried on a credit card yet may have exceeded a reasonable monthly payment based on the current interest rate of the loan and the balance of the loan being carried forward from period to period. This may occur using short term debt such as revolving credit type credit cards or lines of credit. Yet another trigger event may occur when a person's credit score drops and the loan amount is riskier than allowed based on the credit score. The types of trigger events discussed above are meant as illustrations and examples, and are not to be viewed as an exhaustive listing of all the trigger events that can be monitored. Accordingly, guarantors may be notified of different events other than those discussed above, as well as various combinations of the events discussed above or determined to be significant.

Once the change in loan information indicates a loan default is imminent, guarantor alert module 218 provides notification to the guarantor or other party that default on the loan is likely (step 308). For example, if the guarantor requests verbal notification (step 310), then the lending institution or an automated message center will verbally notify the guarantor (step 314). The verbal notification may be sent to the guarantor using a voice communication system, such as a telephony based network. If, however, the guarantor requests to be notified electronically (step 316), then notification may be directed to electronic messaging system 108 where an electronic message, for example, a paging or e-mail message is generated and sent to the guarantor (step 312). Alternatively, a Web site may post such information which the guarantor can access from time to time. Such a Web site may be made secure so that access is limited to authorized users only. The electronic message may describe the particular change in loan information that has occurred and identify the associated guaranteed loan, as well as other pertinent or current loan information (e.g., outstanding balance, last payment amount and date, etc.). Alternatively, if the guarantor requests written notification then guarantor alert module 218 may cause written notification system 110 to generate a printed notification using a printer and send the notification to the guarantor through the mail describing the change in loan information and other pertinent information related to the loan (step 318). Alternatively, the lending institution may decide the type of notification to transmit rather than having the guarantor decide the appropriate type of notification.

While specific embodiments have been described herein for purposes of illustration, various modifications may be made without departing from the spirit and scope of the invention as set forth in the claims. For example, the features consistent with the invention are not limited to guaranteed loans. Notification may also be used by lending institutions and other organizations to track any type of loan issued to a loan recipient, including loans that are not backed by a guarantor. The notification may be used by the financial institution to monitor when the financial status of the loan recipient changes and the loan is at risk of being defaulted. By providing such notification at an early stage, the status of loans can be monitored by the lending institution or organization to determine which loans are at risk and to take measures to prevent the loans from going into default. Accordingly, the invention is not limited to the above described embodiments, but instead is defined by the appended claims in light of their full scope of equivalents.

What is claimed is:

1. A method, executed on a data processing system, of notifying a guarantor of events likely to affect a guaranteed loan, wherein a processor of the data processing system performs operations comprising:

identifying, using the processor, a guaranteed loan associated with the guarantor;

collecting, using the processor, guarantor information for the identified guaranteed loan, wherein the guarantor information includes at least one guarantor preference associated with the guaranteed loan;

selecting loan data associated with the guaranteed loan for monitoring based on the guarantor information;

monitoring, using the processor, changes in the selected loan data;

detecting, using the processor, a change in the selected loan data that indicates a likelihood that at least one term of the identified guaranteed loan will not be met; and providing a notification to the guarantor based on the detecting indicating that the at least one term will not be met.

2. The method of claim 1 wherein detecting further comprises:

comparing a first threshold value for measuring loan data with a first actual value of the loan data; and identifying the guaranteed loan as being at a risk of not meeting the at least one term according to the comparison.

3. The method of claim 1, wherein the loan data includes at least one of a total loan amount, a time period to make a payment, a monthly payment, and a credit score.

4. The method of claim 2, wherein the first actual value includes one of an actual total loan amount, an actual time period no payment has been made against the guaranteed loan, an actual monthly payment associated with the guaranteed loan, and an actual credit score for the loan recipient.

5. The method of claim 2, further comprising:

defining the first threshold value, wherein the first threshold value includes one of a maximum loan amount, a maximum time period to make a payment, a maximum monthly payment, and a minimum credit score.

6. The method of claim 1 wherein the guarantor information further includes guarantor contact information that can be used to contact the guarantor of the guaranteed loan.

7. The method of claim 1 wherein the at least one guarantor preference identifies a type of loan data to be monitored.

8. The method of claim 1 wherein the at least one guarantor preference identifies a preferred form in which the notification shall be provided to the guarantor.

9. The method of claim 1 wherein the at least one guarantor preference identifies information to be included in the notification.

10. The method of claim 8 wherein the form of notification includes at least one of an electronic message, a written notice, and a computer generated verbal notification.

11. The method of claim 1, wherein providing the notification further includes selecting a form of the notification based on the guarantor information and providing the notification to the guarantor in the selected form.

12. The method of claim 1, wherein collecting guarantor information includes requesting and receiving guarantor information from the guarantor.

13. An apparatus for notifying a guarantor associated with a guaranteed loan of events likely to affect their interest in the guaranteed loan, comprising:

a processor; and a memory containing instructions executable by the processor that identify a guaranteed loan associated with the guarantor, collect guarantor information for the identified guaranteed loan, select loan data associated with the guaranteed loan to be monitored based on the guarantor information, monitor changes in the loan data, detect a change in the loan data that indicates a likelihood that at least one term of the identified guaranteed loan will not be met, and provide a notification to the guarantor based on a determination that the at least one term will not be met.

14. The apparatus of claim 13 for notifying a guarantor, further comprising instructions that:

compare a first threshold value for measuring loan data with a first actual value in the loan data; and identify the guaranteed loan as being at risk of not meeting the at least one term according to the comparison.

15. The apparatus of claim 13, wherein the loan data includes at least one of a total loan amount, a time period to make a payment, a monthly payment, and a credit score.

16. The apparatus of claim 14, wherein the first actual value includes one of an actual total loan amount, an actual time period no payment has been made against the guaranteed loan, an actual monthly payment associated with the guaranteed loan, and an actual credit score for the loan recipient.

17. The apparatus of claim 14 further comprising:

defining the first threshold value, wherein the first threshold value includes one of a maximum loan amount, a maximum time period to make a payment, a maximum monthly payment, and a minimum credit score.

18. The apparatus in claim 13 for notifying a guarantor, wherein the guarantor information includes guarantor contact information that can be used to contact the guarantor of the guaranteed loan.

19. The apparatus of claim 13 for notifying a guarantor, wherein the guarantor information identifies a type of loan data to be monitored.

20. The apparatus of claim 13 for notifying a guarantor, wherein the guarantor information identifies a preferred form in which the notification shall be provided to the guarantor.

21. The apparatus of claim 13 for notifying a guarantor, wherein the guarantor information identifies information to be included in the notification.

22. The apparatus of claim 20 for notifying a guarantor, wherein the form of notification includes at least one of an electronic message, a written notice, and a computer generated verbal notification.

23. The apparatus of claim 13 for notifying a guarantor, wherein the memory further includes instructions that are executable by the processor to select a form of the notification based on the guarantor information and provide the notification to the guarantor in the selected form.

24. The apparatus in claim 13 for notifying a guarantor, further includes a user input interface to receive guarantor information directly from the guarantor.

25. An apparatus for notifying a guarantor of events likely to affect a guaranteed loan, comprising:

a processor; and a memory communicatively coupled to the processor, the memory containing modules executed by the processor, the modules comprising:

an identifying module configured to identify a guaranteed loan associated with the guarantor;

a collecting module configured to collect guarantor information for the identified guaranteed loan;

a selection module configured to select loan data associated with the guaranteed loan to be monitored based on the guarantor information;

a monitoring module configured to monitor changes in the loan data;

a detection module configured to detect a change in the loan data that indicates a likelihood that at least one term of the identified guaranteed loan will not be met; and a notification module configured to provide a notification to the guarantor based on the detection module indicating that the at least one term will not be met.

26. A computer-readable medium storing instructions for performing a method, when executed by a processor, for notifying a guarantor of events likely to affect a guaranteed loan, the method comprising:

identifying a guaranteed loan associated with the guarantor;

collecting guarantor information for the identified guaranteed loan, wherein the guarantor information includes at least one guarantor preference associated with the loan;

selecting loan data associated with the guaranteed loan based on the guarantor information;

monitoring changes in the selected loan data;

detecting a change in the selected loan data that indicates a likelihood that at least one term of the identified guaranteed loan will not be met; and providing a notification to the guarantor based on the detecting indicating that the at least one term will not be met.

27. A computer-implemented method of notifying a guarantor of events likely to affect a guaranteed loan, comprising:

collecting, using a processor, loan data including information regarding at least one guaranteed loan;

collecting recipient information associated with a recipient of the loan;

determining at least one threshold value for measuring loan data, based on the recipient information;

monitoring, using the processor, changes in the loan data;

determining, using the processor, a likelihood that the at least one guaranteed loan will not meet at least one term of the guaranteed loan based on a relationship between at least one actual value in the loan data and a corresponding threshold value; and providing, using the processor, a notification to the guarantor based on the likelihood that the at least one term will not be met.

28. The method of claim 27 wherein the at least one threshold value includes at least one of a maximum loan amount, a maximum time period to make a payment, a maximum monthly payment, and a minimum credit score.

29. The method of claim 27 wherein the recipient information includes at least one of information reflecting a creditworthiness of the recipient and a loan payment history of the recipient.

30. A method, executed on a data processing system, of notifying a plurality of guarantors of events likely to affect a guaranteed loan, comprising the following steps performed by a processor of the data processing system:

identifying a plurality of guarantors associated with the guaranteed loan;

collecting, using the processor, guarantor information for each of the identified guarantors, wherein the guarantor information includes at least one guarantor preference associated with the guaranteed loan;

selecting loan data associated with the guaranteed loan for each of the guarantors based on the corresponding guarantor information;

monitoring, using the processor, changes in the selected loan data for each guarantor;

detecting, using the processor, a change in the selected loan data that indicates a likelihood that at least one term of the identified guaranteed loan will not be met; and providing a notification to the plurality of guarantors based on the detecting indicating that the at least one term will not be met.

31. The method of claim 30, wherein providing the notification further includes selecting a form of notification for each of the guarantors based on corresponding guarantor information and providing the notification to the plurality of guarantors in each selected form.

* * * * *